May 6, 1930.                    R. R. JONES                    1,757,803
                        AGITATOR FOR DENTAL MOLDS
                    Filed Nov. 16, 1928        2 Sheets-Sheet 1
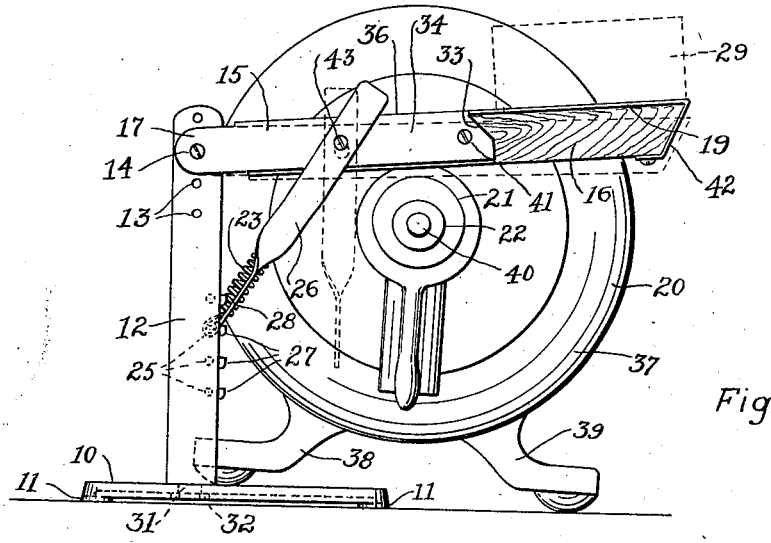
Fig. 1.
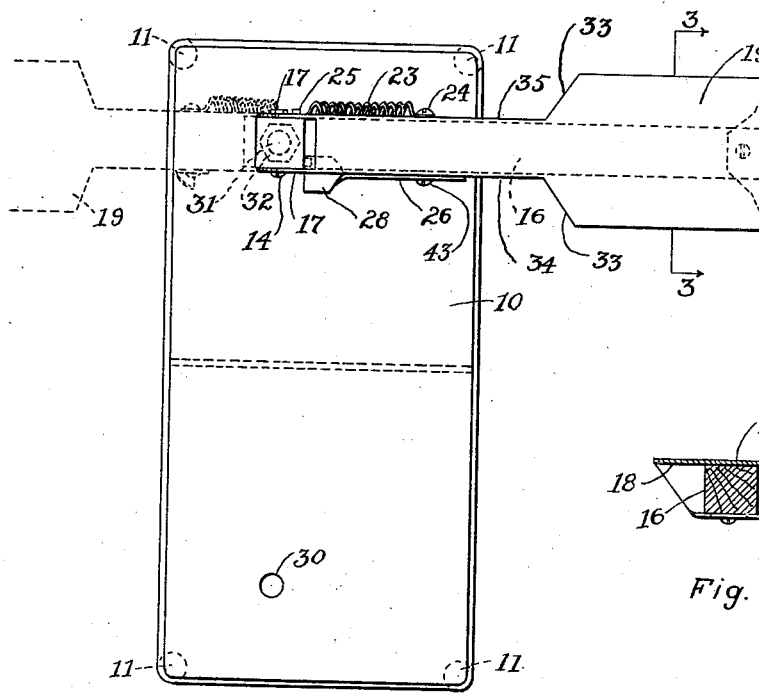
Fig. 2.
Fig. 3.
Inventor
Rolland R. Jones
By Bradbury & Caswell
                Attorney Inventor
Rolland R. Jones
Bradbury & Cauwell
Attorney Patented May 6, 1930

1,757,803

UNITED STATES PATENT OFFICE

ROLLAND R. JONES, OF MINNEAPOLIS, MINNESOTA

AGITATOR FOR DENTAL MOLDS

Application filed November 16, 1928. Serial No. 319,853.

My invention relates to dental appliances and particularly to mechanism for use in connection with the making of molds or casts from impressions or the like where plastic materials are employed. In the making of such molds, it is difficult to cause the plastic substance to fill all of the corners and crevices in the impression and frequently air bubbles are formed in the same which, when situated along the surface of the impression, cause imperfections in the mold or cast, requiring additional trimming and shaping of the final denture. It has heretofore been customary to shake or agitate the mold by hand for a considerable period of time so as to cause the plastic material to fill the mold and permit the air bubbles to escape.

An object of the present invention resides in providing mechanical means whereby the desired results may be rapidly and effectively accomplished by power.

Another object of the invention resides in providing a supporting structure and in pivoting thereto a vibratory member, and in forming said member with an arm and a platform adapted to receive and support the object to be vibrated.

Another object of the invention resides in providing a motor having a cam thereon adapted to engage said arm for vibrating said member.

A still further object of the invention resides in constructing said support with an upright to which said arm is pivoted and a base member extending outwardly therefrom, said base member being arranged to receive the base of said motor and to resist the reaction from the vibration of said member.

Another object of the invention resides in constructing said member so as to permit of the swinging thereof from a position in engagement with said cam upwardly to effect disengagement of said member from the cam when the motor is desired for other purposes.
A feature of the invention resides in providing limiting means for terminating the upward movement of said member and for further providing resilient means connected to said upright and member for holding said member in contact with said cam when in its operative position and for further holding said member in contact with said limiting means when disengaged from said cam.

Another object of the invention resides in constructing said member from a strip of metal and in bending portions thereof to provide a U-shaped arm structure adapted to be pivoted to said upright and a planiform structure adapted to provide a platform for the reception of the object to be vibrated.

A feature of the invention resides in disposing within said U-shaped arm a bearing member adapted to be engaged by said cam and to extend along said platform for reinforcing the same.

A further object of the invention resides in bending over the end of said platform to hold said bearing member attached thereto, and to further reinforce the same.

Other objects of the invention reside in the novel combination of parts and in the details of construction hereinafter illustrated and described.

In the drawings:

Fig. 1 is an end elevational view of a dental appliance illustrating an embodiment of my invention.

Fig. 2 is a plan view of the structure shown in Fig. 1 with portions thereof disposed in altered position and with the motor, used in conjunction with the invention, omitted.

Fig. 3 is a cross sectional view taken on line 3—3 of Fig. 2.

Figure 4:
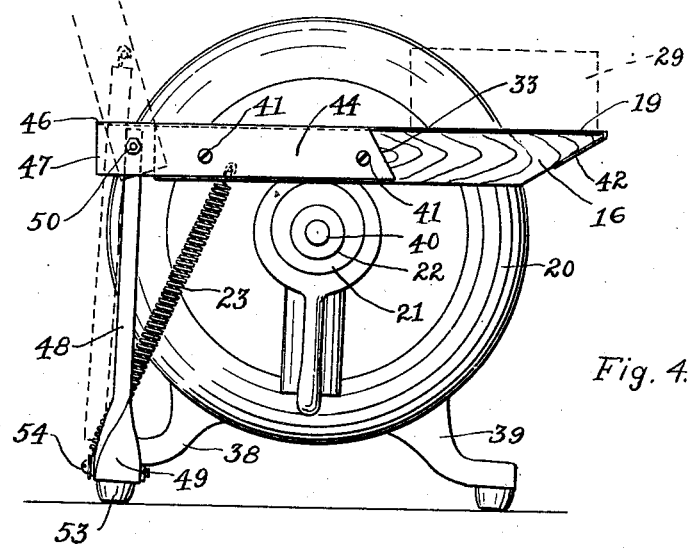
Fig. 4 is an end elevational view similar to Fig. 1 of a modification of the invention.

In referring to the structure shown in Fig. 1, the invention comprises primarily a supporting structure including a base plate 10 constructed to some suitable material such as aluminum, or the like which is provided with feet 11 which rest upon the supporting surface. Upstanding from the base 10 is a post 12 which is adapted to be attached at different positions along the base 10 by means of a number of holes 30 drilled therethrough. The post 12 is constructed at its lower end with a threaded stud 31 which is adapted to pass through any of the holes 30 and which is adapted to receive a nut 32 which serves to rigidly attach the post to the base 10 when said nut is tightly screwed against the underside thereof.

At the upper end of the post 12, are drilled a number of holes 13 which extend transversely through said post. A pivot pin 14 may be selectively disposed in any of these holes and serves to pivot a vibratory member 15 best shown in Fig. 1. This member is preferably formed of a strip of metal which is severed along two transverse lines 33 and the portions thereof indicated at 34 and 35 bent down to form a U-shaped arm structure 36 and a planiform platform 19 integrally connected therewith, the portions 34 and 35 of the member 15 extending outwardly beyond the same to provide ears 17 which are adapted to straddle the upright of post 12 and are drilled to receive the pin 14 in a manner to pivotally mount the member 15 relative to the post 12.

In conjunction with the vibratory member 15 I employ a motor 20 which may be the usual dental lathe ordinarily available in all dental laboratories. This lathe is constructed with a body portion 37 having base members or legs 38 and 39 connected thereto and furthermore includes a shaft 40 carrying the usual chuck 22. To this chuck I attach a cam 21 which in the form of the invention illustrated is in the nature of an eccentric, though it can readily be comprehended that any desired surface may be used on this cam which will give the required movement to the vibratory member.

Within the U-shaped arm 36 is disposed a bearing member 16 which may be constructed of a block of hard wood, compressed fiber or other suitable material having wearing characteristics. This member extends beneath the platform 19 and in addition to providing a wearing surface serves to reinforce said platform. This member is held in place within the U-shaped arm 36 by means of screws 41 and is held attached to the platform 19 by means of the extreme edge 42 thereof which is bent down and turned back over the extreme end of the said bearing member.

For holding the vibratory member 15 in contact with the cam 21 I employ a tension coil spring 23 which may be connected to a screw 24 secured to the arm 36 of member 15 at one end and at its other end to any of a number of pins 25 formed on the post 12 which correspond in number and spacing to the holes 13 in the upper portion of said post. This spring serves to draw the arm 36 downwardly and cause the bearing member 16 to bear against the cam 21 so as to effect a vibratory movement of the platform 19 when the shaft 40 of the motor 20 is operated.

For holding the vibratory member 15 away from the cam 21 when it is desired to terminate the vibratory motion, I employ a detent 26 which is pivoted to the arm 36 by means of a screw 43. This detent is adapted to engage at its lower end 28 any of a number of lugs 27 which protrude upwardly from the post 12. By means of this detent and lugs, the member 15 may be held in a position such as shown in full lines in Fig. 1, or may be raised to a substantially vertical position depending upon the particular lug employed. When it is desired to bring the said member into operative relation with respect to the cam 21, the detent 26 is released and hangs in a position such as shown in dotted lines in Fig. 1.

In the use of the invention, the base 10 is placed upon the surface on which the device is to be used. Motor 20 is then disposed with the leg or base member 38 thereof resting upon the base 10 as shown in Fig. 1. Vibratory member 15 is next adjusted by selecting the proper hole 13 for the reception of pivot pin 14 so that the vibratory member extends normally outwardly from said post in a substantially horizontal position when resting on cam 21. The spring 23 is next suitably tensioned by attachment to the proper spring pin 25. Upon releasing the detent 26 the bearing member 16 is brought into operative relation with the cam 21 and as the motor shaft 40 rotates is given a vibratory movement. By placing the mold, which I have designated in dotted lines at 29 in Fig. 1, upon the platform 19, the same is repeatedly vibrated in a manner to cause the plastic materials used in conjunction therewith to rapidly fill the corners of the mold and to permit the air bubbles within same to escape. Where different sizes of motors or lathes are to be used, the arm 36 is pivoted to post 12 in the proper hole 13 to bring the said arm in the desired relation with respect to the cam 21 and the spring 23 correspondingly adjusted.

Figure 5:
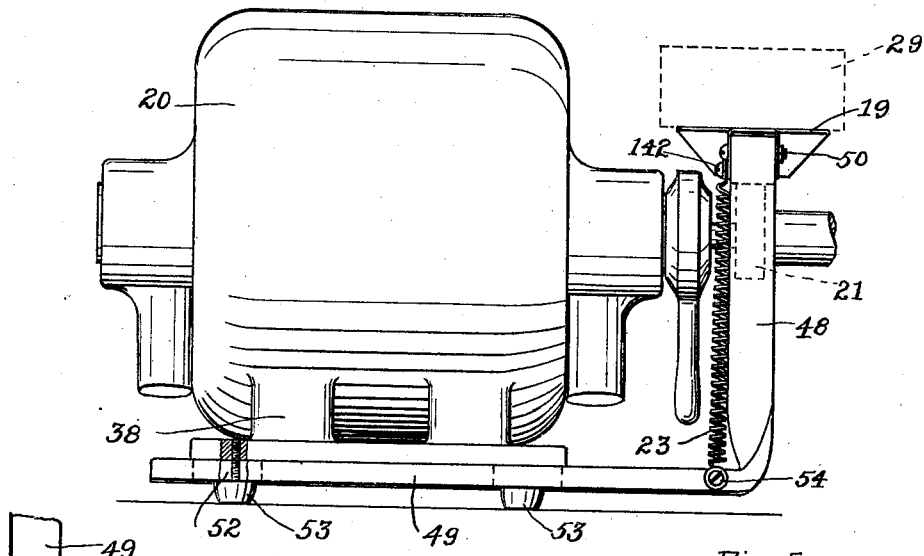
Fig. 5 is a side elevational view of the structure shown in Fig. 4.
Figure 6:
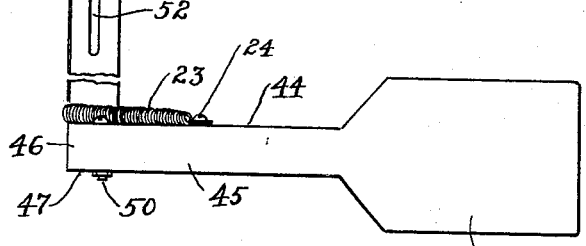
Fig. 6 is a fragmentary plan view of the vibrating arm and supporting structure illustrated in Figs. 4 and 5.

In Figs. 4, 5 and 6, I have shown a modification of the invention which is particularly adapted for use with a single size of motor. In this device a vibratory member 44 is utilized which is identical with the vibratory member 15 except that the upper portion 45 of the arm 36 extends the entire length thereof to form a shoulder 46 adjacent the extreme ends of the ears 47 which correspond to the ears 17. In this case the post 12 and base 10 are supplanted by a post 48 and a base member 49 integrally constructed by bending and twisting a bar of metal into the desired form. The upper end of the post 48 is drilled to receive a pivot pin 50 which extends through the ears 47 and serves to pivotally mount the arm 44 in exactly the same manner as the arm 36. The base portion 49 of this form of the invention may be rigidly bolted to the base member 38 of base member 20 by means of bolts 51 which pass through slots 52 in said base member and which are screwed into the base 38. These bolts may have attached to them cushion members 53 which serve to prevent the device from slipping on the surface on which it is used and which also reduce the noise and the vibration from the motor itself. In this form of the invention the cam 21 and the bearing member 16 are identical with the other form. The spring 23 in this case is attached to a screw 142 in arm 44 and to another screw 54 screwed to the base 49, said spring being permanently mounted instead of adjustably mounted as in the other form of the invention. When it is desired to move the member 44 out of operative engagement with the cam 21, said member may be swung upon its pivot 50 until the shoulder 46 engages the back of the post 48 as shown in dotted lines in Fig. 4. When so disposed, the spring 23 serves to hold the said member in inoperative position.

My invention is extremely simple in construction and effective in operation. The device may be rapidly and easily utilized in conjunction with the ordinary dental lathe without altering or reconstructing the same. In the use of the device it is merely necessary to hold the structure to be vibrated upon the platform provided and when it is desired to discontinue the use of the vibrating mechanism the vibratory member may be swung out of position, permitting the lathe to be used for any of its normal uses. The device may be constructed at a nominal cost and will not readily get out of order.

Changes in the specific form of my invention, as herein disclosed, may be made within the scope of what is claimed without departing from the spirit of my invention.

Having described my invention, what I claim as new, and desire to protect by Letters Patent is:

1. The combination of a motor having a cam on its shaft and of a vibrating device including a supporting structure and a vibratory member, mounted thereon, adapted to engage and be vibrated by said cam, said device being adapted to be brought into cooperative relation with said motor on a common supporting surface and to be assisted in being held in such relation by weight of the motor thereon.

2. The combination with a motor having a cam secured to an exposed portion of its shaft, of associated mechanism comprising a supporting structure including an upright and a base member therefor, a vibratory member pivoted to said upright and adapted to contact with and be vibrated by said cam, said motor being placed to bring weight thereof upon said base member and thereby resist the reaction from the vibration of said vibratory member.

3. The combination with a motor having a cam secured to an exposed portion of its shaft, of associated mechanism comprising a supporting structure including an upright and a base member therefor, a vibratory member pivoted to said upright and adapted to contact with and be vibrated by said cam, yielding means interposed between said vibratory member and supporting structure for holding the former in contact with said cam, said motor being placed to bring weight thereof upon said base member and thereby resist the reaction from the vibration of said vibratory member.

4. A device of the character described comprising a support, a vibratory member pivoted to said support and normally occupying a substantially horizontal position, said member being adapted to swing from its normal to an upright position, means for limiting the movement of said arm at its upright position, means adapted to be engaged by the vibratory member and to vibrate the same, yielding means for holding said member in its normal position in contact with the vibrating means, said yielding means serving further to hold said member in its upright position in engagement with said limiting means.

5. A device of the character described comprising a support, a vibratory member formed of an elongated strip of sheet metal, a part thereof having down bent portions forming an arm U-shaped in cross section, means pivoting one end of said arm to said support, the remaining part of said strip of sheet metal forming a platform at the other end of said arm, a member disposed within said arm, and extending beneath said platform, the same serving the double purpose of a bearing and of a reinforcement for said arm and platform, and means engaging said bearing and reinforcing member for vibrating said vibratory member.

In testimony whereof I have affixed my signature to this specification.

ROLLAND R. JONES.